United States Patent [19]
Kondo et al.

[11] Patent Number: 5,622,035
[45] Date of Patent: Apr. 22, 1997

[54] QUICK BLADE ATTACHMENT STRUCTURE FOR MOWERS

[75] Inventors: Masayoshi Kondo, Okazaki; Katsufumi Takeda, Anjo; Hideki Okubo, Nishio, all of Japan

[73] Assignee: Makita Corporation, Aichi-pref., Japan

[21] Appl. No.: 461,954

[22] Filed: Jun. 5, 1995

[30] Foreign Application Priority Data

Jun. 7, 1994 [JP] Japan .................................. 6-125439

[51] Int. Cl.$^6$ ................................................ A01D 34/82
[52] U.S. Cl. ............................ 56/12.7; 56/17.5; 56/255; 56/295; 56/DIG. 17; 30/276
[58] Field of Search .......................... 56/255, 295, 17.5, 56/12.1, 12.7, DIG. 17, DIG. 20, DIG. 9, DIG. 16; 30/276, 275.4

[56] References Cited

U.S. PATENT DOCUMENTS

| | | | |
|---|---|---|---|
| 3,474,608 | 10/1969 | Frick | 56/255 |
| 3,604,189 | 9/1971 | Harer et al. | 56/295 |
| 4,265,018 | 5/1981 | Schrock et al. | 56/12.7 X |
| 4,313,297 | 2/1982 | Maier | 56/295 |
| 4,525,990 | 7/1985 | Zweegers | 56/295 |
| 4,856,194 | 8/1989 | Lee | 56/12.7 X |

FOREIGN PATENT DOCUMENTS

| | | |
|---|---|---|
| 56-26509 | 6/1981 | Japan . |
| 62-220109 | 9/1987 | Japan . |

*Primary Examiner*—Terry Lee Melius
*Attorney, Agent, or Firm*—Lahive & Cockfield, LLP

[57] ABSTRACT

The invention provides a quick blade attachment structure For quickly but securely attaching and detaching one or a plurality of blades to and from a mower. A rotary member (3) of a mower (1) includes a blade holder (4) and a support member (5) coaxially attached to the blade holder (4) to allow pivotal movement of the support member (5). A pair of blades (23,23) are supported by ends (9a, 9a) of rimmed pins (9,9) projected from a lower surface (4a) of the blade holder (4). A wave washer (16) is interposed between the support member (5) and a cap (17). When the rotary member (3) is assembled by a clamp screw (18), pressing force of the wave washer (16) allows the support member (5) to be rotated integrally with the blade holder (4). The support member (5) further has a pair of grooves (12). Each groove (12) includes a deeper portion (13) which receives the end (9a) of the rimmed pin (9) through relative rotation of either the blade holder (4) or the support member (5) against the pressing force of the wave washer (16), and a guide element (14) which the end (9a) of the rimmed pin (9) moves along to be eventually released from the support member 5. The structure of the invention allows the pair of blades (23,23) to be quickly and easily attached to and detached from the mower (1) by simple rotation of either the blade holder (4) or the support member (5). The structure of the invention also ensures secure attachment of the blades (23,23) to the mower (1). The grooves (12,12) allow the rimmed pins (9,9) to be smoothly moved along the guide elements (14,14) and securely received by the deeper portions (13,13).

22 Claims, 4 Drawing Sheets

QUICK BLADE ATTACHMENT STRUCTURE FOR MOWERS

BACKGROUND OF THE INVENTION

1. Field of the Invention

The present invention relates to a quick blade attachment structure for quickly but securely attaching and detaching one or plurality of blades to and from a mower, where the blades are pivotally attached to a rotary member driven and rotated by means of a motor and are projected radially from the rotary member for rotation.

2. Description of the Related Art

Blades used in a mower are gradually damaged and replaced at some intervals, and are thus detachably attached to a rotary member of the mower. Attachment structures previously proposed include one for pivotally attaching blades to a rotary member with screws and nuts as disclosed in JAPANESE PATENT PUBLICATION GAZETTE No. S-56-26509, and one for inserting blades into apertures formed on a rotary member and fixing the blades to the rotary member with pins as disclosed in JAPANESE PATENT LAYING-OPEN GAZETTE No. S-62-220109.

The conventional structures require attachment of each blade with a screw or pin, thereby consuming labor and time. These structures also need some tools for attachment and detachment of blades with screws and pins. There is also a possibility of missing small pins and screws during attachment or detachment procedure.

SUMMARY OF THE INVENTION

The object of the invention is thus to provide a quick blade attachment structure for quickly but securely attaching and detaching one or a plurality of blades to and from a mower.

The above and the other related objects are realized by a quick blade attachment structure for a mower. The blade attachment structure includes

- a rotating plate revolving integrally with a shaft projected from a motor housing.
- a pivotally moving plate disposed between a motor of the mower and the rotating plate or on an opposite side of the rotating plate far from the motor to be coaxially with the rotating plate and to allow pivotal movement of the pivotally moving plate,
- at least one blade rotatably attached between the rotating plate and the pivotally moving plate and disposed to be projectable in a radial direction,
- pressing means mounted on at least one of the rotating plate and the pivotally moving plate for pressing one of the rotating plate and the pivotally moving plate against the other of the rotating plate and the pivotally moving plate,
- at least one pin projected from one of the rotating plate and the pivotally moving plate to the other for rotatably fixing the at least one blade, and
- at least one anti-slip off means formed on the other of the rotating plate and the pivotally moving plate, from which the at least one pin is not projected, for receiving the at least one pin with the blade attached thereto, the anti-slip off means is movable between a first position, where the pin is received by the anti-slip off means to prevent the slip-off of the blade through relative rotation of the rotating plate to the pivotally moving plate or relative rotation of the pivotally moving plate to the rotating plate thereby compressing the pressing means, and a second position, where the pin is released from the anti-slip off means to allow attachment or detachment or the blade.

In this structure, the pressing means presses one of the rotating plate and the pivotally moving plate against the other. For attachment of the blade one of the rotating plate and the pivotally moving plate is rotated relative to the other thereby compressing the pressing means, and the pin is moved to the second position, where the pin is released from the anti-slip off means to allow attachment or detachment of the blade. Under such condition, the blade is inserted to the free end of the pin. The pin is then moved to the first position, where the pin is received by the anti-slip off means to prevent the slip-off of the blade through relative rotation of the rotating plate to the pivotally moving plate or relative rotation of the pivotally moving plate to the rotating plate thereby compressing the pressing means. This allows the blade to be rotatably but securely attached between the rotating plate and the pivotally moving plate. The structure of the invention allows the blade to be quickly and easily attached to and detached from the mower by simple rotation of either the rotating plate or the pivotally moving plate.

The invention is also directed to another blade attachment structure including

- a rotating plate revolving integrally with a shaft projected from a motor housing,
- a pivotally moving plate disposed between a motor of the mower and the rotating plate or on an opposite side of the rotating plate far from the motor to be coaxially with the rotating plate and to allow pivotal movement of the pivotally moving plate,
- at least one blade rotatably attached between the rotating plate and the pivotally moving plate and disposed to be projectable in a radial direction,
- at least one pin movably mounted on one of the rotating plate and the pivotally moving plate for rotatably fixing the at least one blade, the pin having pressing means for pressing the other of the pivotally moving plate and the rotating plate, and
- at least one anti-slip off means formed on the other of the rotating plate and the pivotally moving plate, on which the at least one pin is not mounted, for engaging with the at least one pin with the blade attached thereto, the anti-slip off means is movable between a first position, where the pin is engaged with the anti-slip off means to prevent the slip-off of the blade through relative rotation of the rotating plate to the pivotally moving plate or relative rotation of the pivotally moving plate to the rotating plate thereby compressing the pressing means, and a second position, where the pin is released from the anti-slip off means to allow attachment or detachment of the blade.

In this structure, for attachment of the blade, one of the rotating plate and the pivotally moving plate is rotated relative to the other thereby compressing the pressing means, and the pin is moved to the second position, where the pin is released from the anti-slip off means to allow attachment or detachment of the blade. Under such condition, the blade is inserted to the free end of the pin. The pin is then moved to the first position, where the pin is engaged with the anti-slip off means to prevent the slip-off of the blade through relative rotation of the rotating plate to the pivotally moving plate or relative rotation of the pivotally moving plate to the rotating plate there compressing the pressing means. This allows the blade to be rotatably but securely attached between the rotating plate and the pivotally moving plate. This structure of the invention also allows the blade to be quickly and easily attached to and detached from the mower by simple rotation of either the rotating plate or the pivotally moving The rotating plate is arranged to be apart from the pivotally moving plate by a predetermined distance.

The anti-slip off means generally includes a recess. According to a preferable structure, the anti-slip off means includes a groove coincident with an orbit of movement of each pin. The groove has a guide element which the pin comes into contact and moves along, and a deeper portion connecting with the guide element for receiving an end of the pin. The deeper portion has a depth greater than that off the guide element.

The groove having the deeper portion and the guide element allows the pin to be smoothly moved among the guide element and securely received by the deeper portion.

The groove further includes a first inclined surface between one end of the guide element and the deeper portion and a second inclined surface on the other end off the guide element.

These and other objects, features, aspects, and advantages of the present invention will become more apparent from the following detailed description off the preferred embodiment with the accompanying drawings.

DESCRIPTION OF THE PREFERRED EMBODIMENT

Figure 1:
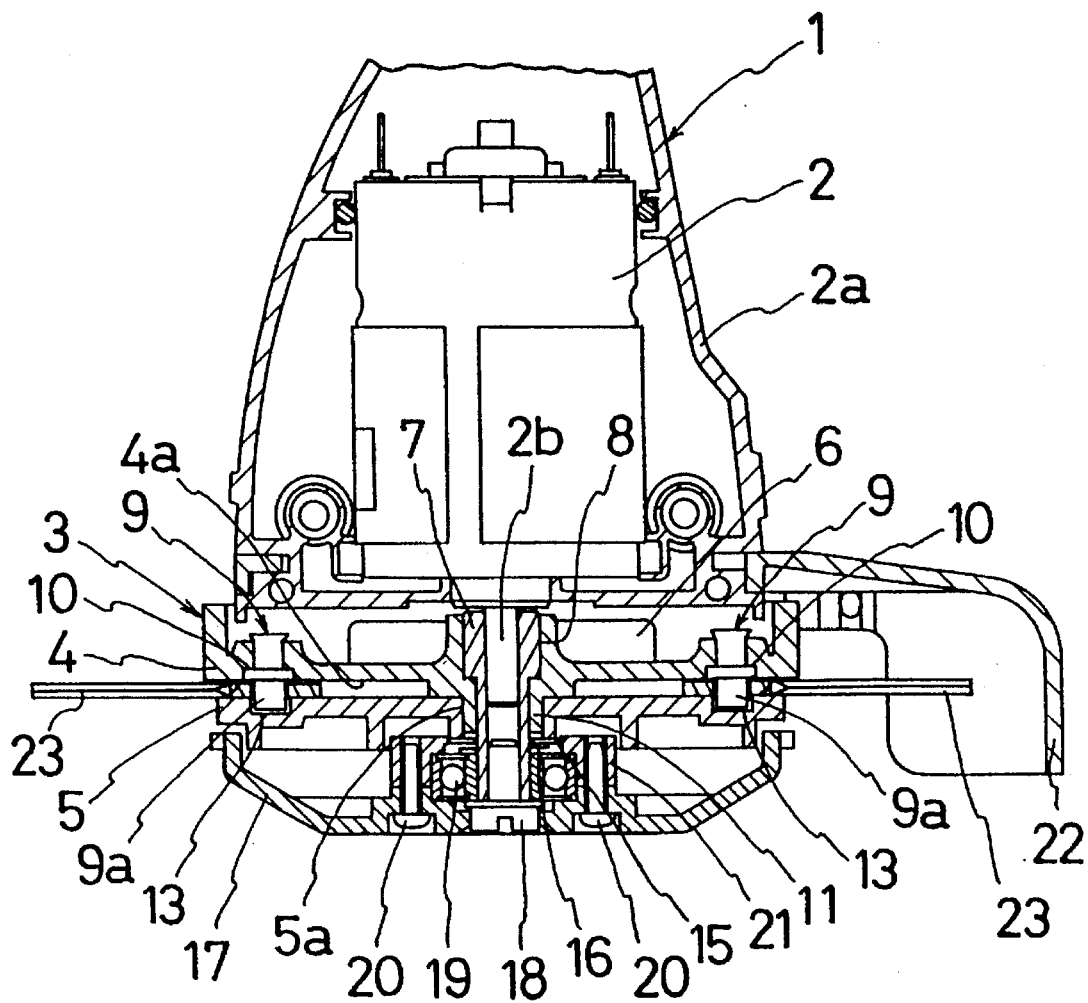
FIG. 1 is a partially cross sectional view illustrating a mower 1 embodying the invention.

FIG. 1 is a partially cross sectional view illustrating a mower 1 embodying the invention. The mower 1 includes a motor housing 2a connecting with a handle (not shown) via a long pipe and receiving a motor 2 therein, and a rotary member 3 driven and rotated by the motor 2. The motor housing 2a has a safety cover 22 mounted on a lower portion thereof. A pair of blades 23 are project radially from the rotary member 3 for rotation. The rotary member 3 further includes a blade holder 4 integrally rotating with a shaft 2b, a support member 5 attached to the blade holder 4 to allow pivotal movement of the support member 5, and a cap 17. The blade holder 4 and the support member 5 respectively work as a rotating plate and a pivotally moving plate.

A fan 6 is integrally attached to the upper surface of the blade holder 4. A motor shaft 7 receiving the shaft 2b and having a hexagonal large-diametral head is fitted in an aperture 8 formed on the center of the blade holder 4. The blade holder 4 rotates integrally with the shaft 2b via the motor shaft 7 by inserting and fitting the motor shaft 7 into the aperture 8. A pair of rimmed pins 9,9 symmetrically arranged on the circumference of the aperture 8 are respectively inserted from a lower surface 4a of the blade holder 4 into stepped holes 10,10. Heads of the rimmed pins 9,9 projected from the stepped holes 10,10 are caulked and fixed to the blade holder 4, while ends 9a,9a of the rimmed pins 9,9 are protruded from the lower surface 4a of the blade holder 4. A cylindrical member 11 is extended From the aperture 8 of the blade holder 4 and fitted in an engagement aperture 5a of the support member 5, which has a diameter a little greater than that off the cylindrical member 11.

The cap 17 disposed below the support member 5 has a clamp screw 18 fitted in a tapped inner wall of the motor shaft 7, and a ball bearing 19 in a bearing box 21 screwed to the cap 17 via a pair of fixation screws 20,20. Clamping of the clamp screw 18 to the motor shaft 7 fixes the cap 17 to the shaft 2b and activates the ball bearing 19 to support the motor shaft 7.

A Flat washer 15 and a wave washer 16 are interposed between the bearing box 21 and a lower end of the engagement aperture 5a of the support member 5. When the cap 17 and the support member 5 are clamped to the blade holder 4 with the clamp screw 18, elasticity of the wave washer 16 presses the support member 5 against the blade holder 4. This structure, however, allows only the support member 5 to be rotated manually thereby compressing the pressing means. Under the condition of normal motor operation, rotation of the shaft 2b integrally rotates the elements except the cap 17, that is, the motor shaft 7 the blade holder 4, the support member 5, and the clamp screw 18.

Figure 2:
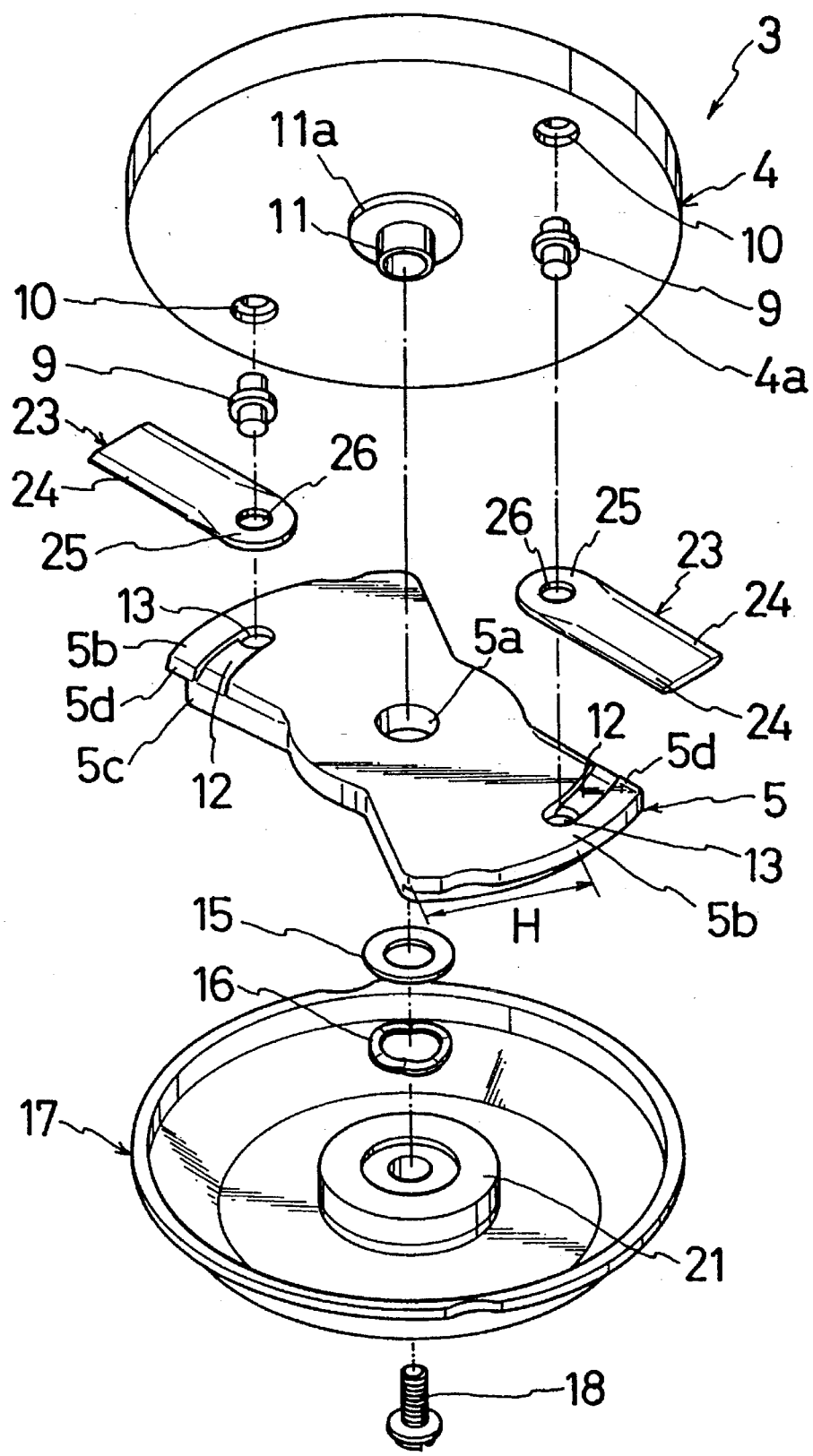
FIG. 2 is a decomposed view illustrating a rotary member 3 off the mower 1.
Figure 3:
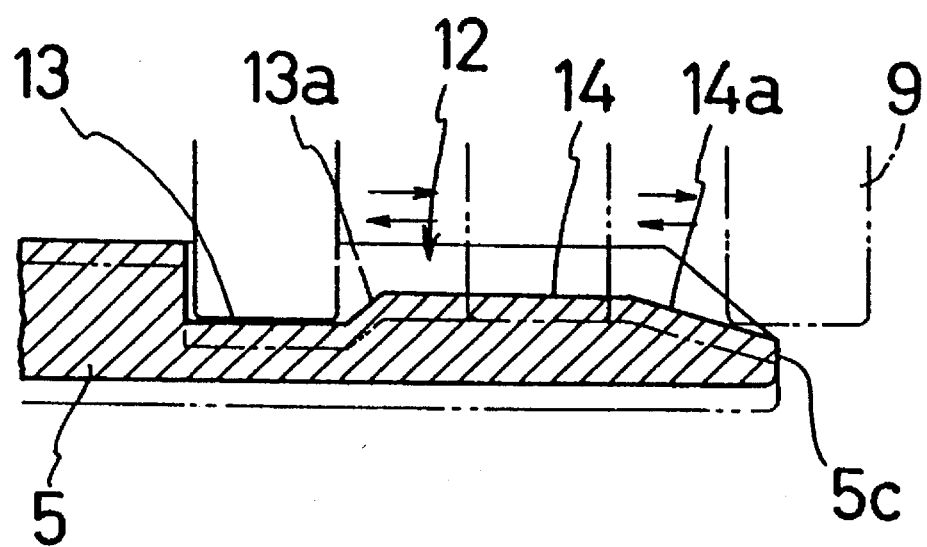
FIG. 3 shows a detailed structure of a groove 12.

FIG. 2 is a disassembled view illustrating the rotary member 3, where only the blade holder 4 is seen from the bottom. The cylindrical member 11 has a ring step 11a disposed on the lower surface 4a of the blade holder 4. The ring step 11a ensures a predetermined distance between the blade holder 4 and the support member 5 attached to the cylindrical member 11 as clearly seen in FIG. 1. In this embodiment, the predetermined distance is substantially equal to a thickness of each blade 23. The support member 5 has a pair of fan-shaped elements 5b,5b arranged symmetrically about the engagement aperture 5a, and a pair of arc-shaped grooves 12,12 receiving the rimmed pins 9,9 and coincident with an orbit of rotation of the rimmed pins 9,9. As illustrated in FIG. 3, each groove 12 has a deeper portion 13 for receiving the end of the rimmed pin 9, and a guide element 14 which the rimmed pin 9 comes into contact with and moves along. The deeper portion 13 has a depth greater than that of the guide element 14. The groove 12 also includes a first inclined surface 13a formed on the boundary between the deeper portion 13 and the guide element 14 and a second inclined surface 14a formed on the boundary between the guide element 14 and a side wall 5c of the support member 5.

Each blade 23 is a thin piece off synthetic resin having cutting edges 24,24 on either side thereof and an aperture 26 formed on one end 25 thereof. Each rimmed pin 9 is inserted into the aperture 26 and received by the deeper portion 13 of the groove 12 formed on the support member 5. This structure prevents the end 9a of the rimmed pin 9 from slipping off as shown in FIG. 1. The pair of blades 23,23 disposed between the blade holder 4 and the support member 5 are rotatable about the rimmed pins 9,9.

The outer diameter of the support member 5 is made smaller than those of the blade holder 4 and the cap 17 to protect the support member 5 from obstacles such as stones and gravel.

In the mower 1 thus constructed, when the rotary member 3 is assembled, the ends 9a,9a off the rimmed pins 9,9 projected from the lower surface 4a of the blade holder 4 are positioned in the deeper portions 13,13 of the grooves 12,12 as illustrated in FIG. 1 For attachment of the blades 23,23, the support member 5 is rotated clockwise (seen from the motor 2) While the blade holder 4 is fixed with a single hand. Alternatively, the blade holder 4 may be rotated counterclockwise (seen from the motor 2) while the support member 5 is fixed with a single hand. Elasticity of the wave washer 16 allows single rotation of the support member 5 or the blade holder 4 and backward movement of the support member 5 relative to the blade holder 4. As shown by the two-dot chain line in FIG. 3, the end 9a of each rimmed pin 9 moves rightward from the deeper portion 13 to rise along the first inclined surface 13a to the guide element 14 and is eventually released from the groove 12 to be free. After the ends 9a,9a of the rimmed pins 9,9 are inserted into the apertures 26,26 formed on the ends 25,25 off the blades 23,23, the blade holder 4 is rotated clockwise or otherwise the support member 5 is rotated counterclockwise. The rotation causes the end 9a of each rimmed pin 9 to move leftward from the position shown by the two-dot chain line in FIG. 3 and rise along the second inclined surface 14a to the guide element 14. The end 9a of the rimmed pin 9 further slides along the guide element 14 and is eventually received by the deeper portion 13, while the blade 23 is rotatably supported by the rimmed pin 9. This rightward movement off the rimmed pins 9,9 into the deeper portions 13,13 of the grooves 12,12 allows the pair of blades 23,23 to be attached to the mower 1.

The structure of the embodiment does not require additional operation of the clamp screw 18 for making a space between the blade holder 4 and the support member 5. Rotation of the blade bolder 4 or the support member 5 allows the end 9a of the rimmed pin 9 for rotatably supporting the blade 23 to be free from the groove 12. This allows quick and easy attachment and detachment of the blades 23,23 to and from the mower 1. The blades 23,23 once attached to the mower 1 are securely held by the rimmed pins 9,9 and the grooves 12,12.

In the structure of the embodiment, the support member 5 also has an inclined surface 5d formed on the side wall 5c. While the rimmed pins 9,9 are inserted into the apertures 26,26 formed on the ends 25,25 of the blades 23,23 and the ends 9a,9a of the rimmed pins 9,9 are moved rightward to the deeper portions 13,13 of the grooves 12,12, the end 25 of the blade 23 may come into contact with the side wall 5c of the support member 5. In such a case, the inclined surface 5d formed on the support member 5 guides the blade 23 to set between the support member 5 and the blade holder 4.

In a conventional mower having thin-plate blades as in this embodiment, the blades are momentarily drawn back into a rotary member when being collided with obstacles such as stones, gravel, and branches. Such collision may, however, deform or bend the blade, which is then stuck between a support member and a cap. In the structure of the embodiment, on the other hand, a width H from one end of the fan-shaped element 5b of the support member 5 to the deeper portion 13 of the groove 12 (see FIG. 2) is set substantially equivalent to the length of the blade 23 from the aperture 26. The blade 23 collided with some obstacle is thus drawn back simply into the space between the blade holder 4 and the support member 5 and is not stuck between the support member 5 and the cap 17.

The above embodiment is only illustrative and not restrictive in any sense. There may be many other modifications, alterations, and changes without departing from the scope or spirit of essential characteristics of the invention. Some examples of modification are given below.

Pressing means other than the wave washer used in the above embodiment, such as a coil spring, a rubber ring, and felt, may be applied to press the support member 5. Although the wave washer 16 working as the pressing means is disposed below the support member 5 in the above embodiment, the pressing means may be interposed between the motor shaft and the blade holder rotatably attached to the motor shaft, so as to press the blade holder. In another possible structure, both the blade holder and the support member have pressing means. Alternatively the support member may be made of a metal having sufficient elasticity to press the support member itself against the blade holder.

In the structure of the above embodiment, the groove 12 has the first inclined surface 13a on the deeper portion 13 and the second inclined surface 14a on the guide element 14. These inclined surfaces are not required when the rimmed pins have tapered or speared ends. In another structure allowing either the rotating plate or the pivotally moving plate to move backward by a relatively large distance by means off appropriate pressing means, the support member may have recesses, instead of the grooves 12, for receiving the rimmed pins. In this modified structure, ends of the rimmed pins are directly inserted into and released from the recesses through relative rotations. According to still another possible structure, the support member may have no grooves or recesses. As long as the support member is pressed against the ends of the rimmed pins, the structure securely fixes the blades.

The groove may have an opposite orientation on the support member. This makes the relative rotations of the blade holder and the support member opposite to those of the above embodiment. According to another modification, grooves may be formed on the blade holder while the support member has rimmed pins.

Figure 4A:
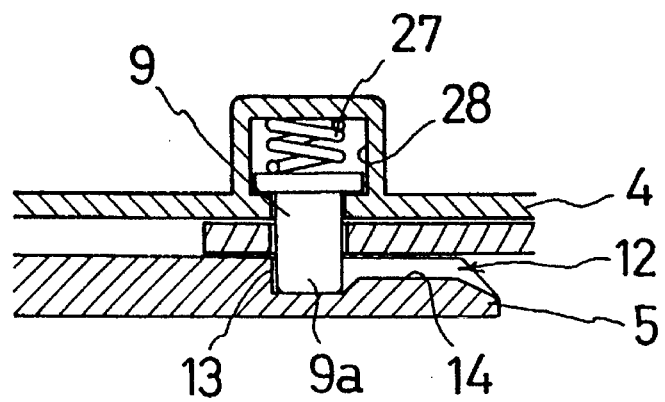
FIGS. 4(A) through 4(C) show a rimmed pin 9 with pressing means.
Figure 4B:
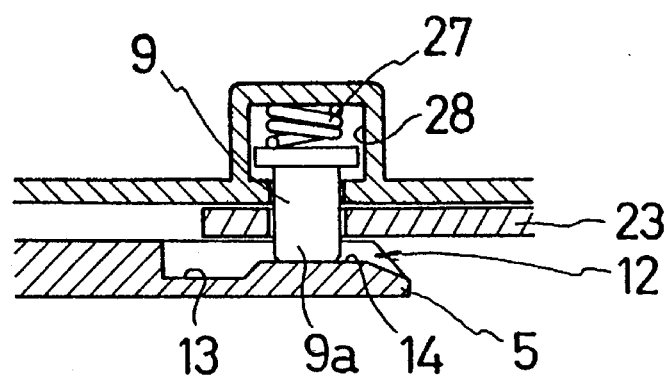
Figure 4C:
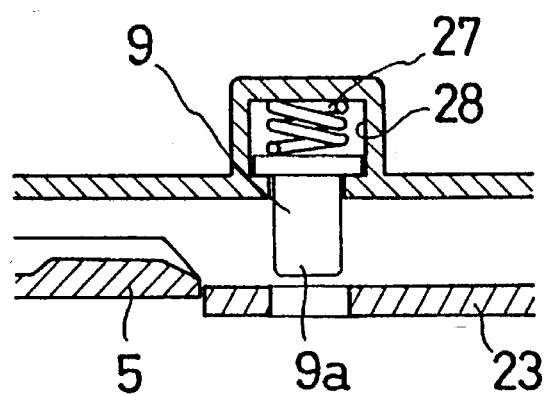

Although either the rotating plate or the pivotally moving plate has pressing means In the above embodiment, only rimmed pins may have pressing means. As shown in FIGS. 4(A) through 4(B), the blade holder 4 has a bottomed hole 28 with a spring 27, and the rimmed pin 9 is pressingly received by the bottomed hole 28. Under the condition shown in FIG. 4(A), the blade holder 4 and the support member 5 are integrally rotated by the rimmed pins 9 Fitted in the deeper portions 13 of the grooves 12. When either the blade holder 4 or the support member 5 is rotated for attachment or detachment of blades, the rimmed pin 9 is pressed into the bottomed hole 28 against the spring 27. The end 9a of the rimmed pin 9 moves rightward From the deeper portion 13 of the groove 12 to rise on the guide element 14 as shown in FIG. 14(B), and is eventually separated From the groove 12 to be free as shown in FIG. 14(C). Like the above embodiment, this structure allows the blades to be quickly and easily attached to and detached from the mower by simple rotation of either the rotating plate or the pivotally moving plate.

This structure does not require any pressing means including a wave washer for the blade holder 4 or the support member 5. This structure is also modified as the above embodiment; for example, grooves may be formed on the blade holder while the support member has rimmed pins; or pressing means other than the spring 27 may be applied to press the rimmed pins 9.

The structure of the invention allows one or a plurality of blades to be quickly and easily attached to and detached from the mower by simple rotation of either the rotating plate or the pivotally moving plate. The structure of the invention also ensures secure attachment of the blades to the mower.

The groove having a deeper portion and a guide element allows the rimmed pin to be smoothly moved along the guide element and securely received by the deeper portion.

The scope and spirit of the present invention are limited only by the terms of the appended claims.

What is claimed is:

1. A blade attachment structure for a mower, said blade attachment structure comprising
   a rotating plate revolving integrally with a shaft projected from a motor housing,
   a pivotally moving plate disposed on an opposite side of said rotating plate from a motor of said mower, said pivotally moving plate being coaxially aligned with said rotating plate to allow pivotal movement of said pivotally moving plate relative to said rotating plate,
   at least one blade rotatably attached between said rotating plate and said pivotally moving plate and disposed to project in a radial direction therefrom,
   pressing means mounted on at least one of said rotating plate and said pivotally moving plate for pressing one of said plates against the other plate,
   at least one pin projecting from one of said plates to the other plate for rotatably fixing said at least one blade, and
   at least one anti-slip off means formed on the other plate for receiving said at least one pin, said anti-slip off means being movable, through rotation of said rotating plate relative to said pivotally moving plate, between a first position, where said pin is received by said anti-slip off means to prevent the slip-off of said blade, and a second position, where said pin is released from said anti-slip off means to allow attachment or detachment of said blade.

2. A blade attachment structure for a mower, said blade attachment structure comprising
   a rotating plate revolving integrally with a shaft projected from a motor housing,
   a pivotally moving plate disposed on an opposite side of said rotating plate from a motor of said mower, said pivotally moving plate being coaxially aligned with said rotating plate to allow pivotal movement of said pivotally moving plate relative to said rotating plate,
   at least one blade rotatably attached between said rotating plate and said pivotally moving plate and disposed to project in a radial direction therefrom,
   at least one pin movably mounted on one of said rotating plate and said pivotally moving plate for rotatably fixing said at least one blade, said pin comprising pressing means for pressing the other plate, and
   at least one anti-slip off means formed on the other plate for engaging with said at least one pin, said anti-slip off means being movable, through rotation of said rotating plate relative to said pivotally moving plate, between a first position, where said pin is engaged with said anti-slip off means to prevent the slip-off of said blade, and a second position, where said pin is released from said anti-slip off means to allow attachment or detachment of said blade.

3. A blade attachment structure in accordance with either one of claims 1 and 2, wherein said rotating plate is arranged to be apart from said pivotally moving plate by a predetermined distance.

4. A blade attachment structure in accordance with either one of claims 1 and 2, wherein said anti-slip off means comprises means forming a recess.

5. A blade attachment structure in accordance with either one of claims 1 and 2, wherein said anti-slip off means comprises means forming a groove coincident with an orbit of movement of said pin, said groove having a guide element which said pin comes into contact and moves along, and a deeper portion connecting with said guide element for receiving an end of said pin, said deeper portion having a depth greater than that of said guide element.

6. A blade attachment structure in accordance with claim 5, wherein said groove has a first inclined surface between one end of said guide element and said deeper portion and a second inclined surface on the other end of said guide element.

7. A blade attachment structure in accordance with either one of claims 1 and 2, wherein said pressing means comprises a wave washer.

8. A blade attachment structure in accordance with either one of claims 1 and 2, wherein said pressing means comprises any one of a coil spring, a rubber ring, and a piece of felt.

9. A blade attachment structure for a mower, said blade attachment structure comprising
   a rotating plate revolving integrally with a shaft projected from a motor housing,
   a pivotally moving plate disposed between a motor of said mower and said rotating plate, said pivotally moving plate coaxially aligned with said rotating plate to allow pivotal movement of said pivotally moving plate relative to said rotating plate,
   at least one blade rotatably attached between said rotating plate and said pivotally moving plate mad disposed to project in a radial direction therefrom,
   pressing means mounted on at least one of said rotating plate and said pivotally moving plate for pressing one of said plates against the other plate,
   at least one pin projecting from one of said plates toward the other plate for rotatably fixing said at least one blade, and
   at least one anti-slip off means formed on the other plate, for receiving said at least one pin, said anti-slip off means being movable, by rotating said rotating plate relative to said pivotally moving plate, between a first position, where said pin is received by said anti-slip off means to prevent the slip-off of said blade, and a second position, where said pin is released from said anti-slip off means, to allow attachment or detachment of said blade.

10. A blade attachment structure for a mower, said blade attachment structure comprising
    a rotating plate revolving integrally with a shaft projected from a motor housing,
    a pivotally moving plate disposed between a motor of said mower and said rotating plate, said pivotally moving plate coaxially aligned with said rotating plate to allow pivotal movement of said pivotally moving plate relative to said rotating plate,
    at least one blade rotatably attached between said rotating plate and said pivotally moving plate and disposed to project in a radial direction therefrom,
    at least one pin movably mounted on one of said rotating plate and said pivotally moving plate for rotatably fixing said at least one blade, said pin comprising pressing means for pressing said pin against the other plate, and
    at least one anti-slip off means formed on the other plate, on which said at least one pin is not mounted, for engaging with said at least one pin, said anti-slip off means being movable, by rotating said rotating plate relative to said pivotally moving plate, between a first position, where said pin is engaged with said anti-slip off means to prevent the slip-off of said blade, and a second position, where said pin is released from said anti-slip off means, to allow attachment or detachment of said blade.

11. A blade attachment structure in accordance with either one of claims 9 and 10, wherein said rotating plate is arranged to be apart from said pivotally moving plate by a predetermined distance.

12. A blade attachment structure in accordance with either one of claims 9 and 10, wherein said anti-slip off means comprises means forming a recess.

13. A blade attachment structure in accordance with either one of claims 9 and 10, wherein said anti-slip off means comprises means forming a groove coincident with an orbit of movement of said pin, said groove having a guide element with which said pin comes into contact and along which said pin moves, and having a deeper portion connecting with said guide element for receiving an end of said pin, said deeper portion having a depth greater than that of said guide element.

14. A blade attachment structure in accordance with claim 13, wherein said groove includes a first inclined surface between one end of said guide element and said deeper portion and a second inclined surface on the other end of said guide element.

15. A blade attachment structure in accordance with either one of claims 9 and 10, wherein said pressing means comprises a wave washer.

16. A blade attachment structure in accordance with either one of claims 9 and 10, wherein said pressing means comprises any one of a coil spring, a rubber ring, and a piece of felt.

17. A blade attachment structure for a mower, said blade attachment structure comprising a plate revolving integrally with a shaft of a motor of a mower, said shaft projected from a motor housing, a pivotally moving plate coaxially aligned with said rotating plate to allow pivotal movement of said pivotally moving plate relative to said rotating plate, at least one blade rotatably attached between said rotating plate and said pivotally moving plate and disposed to project in a radial direction therefrom, pressing means mounted on at least one of said rotating plate and said pivotally moving plate for pressing one of said plates against the other plate, at least one pin projecting from one of said rotating plates toward the other plate for rotatably fixing said at least one blade, and at least one anti-slip off means formed on the other plate for receiving said at least one pin, said anti-slip off means being movable, by rotation of said rotating plate relative to said pivotally moving plate, between a first position, where said pin is received by said anti-slip off means to prevent the slip-off of said blade, and a second position, where said pin is released from said anti-slip off means to allow attachment or detachment of said blade.

18. A blade attachment structure for a mower, said blade attachment structure comprising a rotating plate revolving integrally with a shaft of a motor of a mower, said shaft projected from a motor housing, a pivotally moving plate coaxially aligned with said rotating plate to allow pivotal movement of said pivotally moving plate relative to said rotating plate, at least one blade rotatably attached between said rotating plate and said pivotally moving plate and disposed to project in a radial direction therefrom, at least one pin movably mounted on one of said rotating plate and said pivotally moving plate for rotatably fixing said at least one blade, said pin comprising pressing means for pressing the other plate, and at least one anti-slip off means formed on the other plate, for engaging with said at least one pin, said anti-slip off being movable, by rotation of said rotating plate relative to said pivotally moving plate, between a first position, where said pin is engaged with said anti-slip off means to prevent the slip-off of said blade, and a second position, where said pin is released from said anti-slip off means to allow attachment or detachment of said blade.

19. A blade attachment structure in accordance with either one of claims 17 and 18, wherein said rotating plate is arranged to be spaced apart from said pivotally moving plate by a predetermined distance.

20. A blade attachment structure in accordance with either one of claims 17 and 18, wherein said anti-slip off means comprises means forming a recess.

21. A blade attachment structure in accordance with either one of claims 17 and 18, wherein said anti-slip off means comprises means forming a groove coincident with an orbit of movement of said pin, said groove having a guide element with which said pin comes into contact and along which said pin moves, and a deeper portion connecting with said guide element for receiving an end of said pin, said deeper portion having a depth greater than that of said guide element.

22. A blade attachment structure in accordance with claim 21, wherein said groove includes a first inclined surface between one end of said guide element and said deeper portion and a second inclined surface on the other end of said guide element.

* * * * *